(12) United States Patent  
Ichinose et al.

(10) Patent No.: US 10,725,457 B2  
(45) Date of Patent: Jul. 28, 2020

(54) MACHINING TIME PREDICTION SYSTEM

(71) Applicant: FANUC Corporation, Yamanashi (JP)

(72) Inventors: Makoto Ichinose, Yamanashi (JP); Yasuharu Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 93 days.

(21) Appl. No.: 16/105,311

(22) Filed: Aug. 20, 2018

(65) Prior Publication Data

US 2019/0064779 A1  Feb. 28, 2019

(30) Foreign Application Priority Data

Aug. 23, 2017  (JP) .................................. 2017-160457

(51) Int. Cl.
*G05B 19/00* (2006.01)
*G05B 19/418* (2006.01)

(52) U.S. Cl.
CPC ............. *G05B 19/4181* (2013.01); *G05B 2219/33101* (2013.01); *G05B 2219/33342* (2013.01)

(58) Field of Classification Search
CPC ...... G05B 19/4181; G05B 2219/33101; G05B 2219/33342; G05B 2219/31407; G05B 19/4155; G05B 19/4142; G05B 2219/35026
See application file for complete search history.

(56) References Cited

U.S. PATENT DOCUMENTS

| | | | | |
|---|---|---|---|---|
| 7,167,772 B2 * | 1/2007 | Hioki | ................ | G05B 19/4103 318/568.1 |
| 8,938,316 B2 * | 1/2015 | Otsuki | ............... | G05B 19/4069 700/160 |
| 10,514,681 B2 * | 12/2019 | Aizawa | ................ | G05B 19/416 |
| 10,528,041 B2 * | 1/2020 | Taira | ...................... | G05B 23/00 |
| 2005/0228533 A1* | 10/2005 | Hioki | ................ | G05B 19/4103 700/159 |
| 2006/0089746 A1* | 4/2006 | Kakino | ................... | G05B 19/19 700/179 |

(Continued)

FOREIGN PATENT DOCUMENTS

| | | |
|---|---|---|
| JP | 2004-227028 A | 8/2004 |
| JP | 2006-106858 A | 4/2006 |

(Continued)

OTHER PUBLICATIONS

So, B. S., et al. "Five-axis machining time estimation algorithm based on machine characteristics." Journal of Materials Processing Technology 187 (2007): 37-40. (Year: 2007).*

(Continued)

*Primary Examiner* — Michael D Masinick  
(74) *Attorney, Agent, or Firm* — Hauptman Ham, LLP

(57) ABSTRACT

A machining time prediction system divides a machining program to be executed by a machine tool into a plurality of sections, transfers the divided machining programs to arithmetic unit to calculate machining times and integrates the calculated machining times. Thus, when hardware resources of an arithmetic processing apparatus for calculating a machining time are lacking, it is possible to perform necessary calculations in cooperation with the other management apparatus or machine tool or the like, and thereby shorten a processing time.

8 Claims, 8 Drawing Sheets

(56) References Cited

U.S. PATENT DOCUMENTS

| | | |
|---|---|---|
| 2008/0052049 A1 | 2/2008 | Moriyama et al. |
| 2009/0299509 A1 | 12/2009 | Diezel et al. |
| 2012/0296462 A1* | 11/2012 | Otsuki ............... G05B 19/4069 700/104 |
| 2014/0200706 A1 | 7/2014 | Pruschek et al. |

FOREIGN PATENT DOCUMENTS

| | | |
|---|---|---|
| JP | 2008-40983 A | 2/2008 |
| JP | 2009-510574 A | 3/2009 |
| JP | 2014-522529 A | 9/2014 |

OTHER PUBLICATIONS

Liu, Changqing, et al. "A feature-based method for NC machining time estimation." Robotics and Computer-Integrated Manufacturing 29.4 (2013): 8-14. (Year: 2013).*

* cited by examiner

| PROGRAM TEXT SECTION | PROCESSING TIME (MINUTES) |
|---|---|
| SECTION 1 | 1 |
| SECTION 2 | 2 |
| SECTION 3 | 3 |
| SECTION 4 | 1 |
| TOTAL NC PROGRAM (TOTAL) | 7 |

MACHINING TIME PREDICTION SYSTEM

RELATED APPLICATIONS

The present application claims priority of Japanese Application Number 2017-160457, filed on Aug. 23, 2017, the disclosure of which is hereby incorporated by reference herein in its entirety.

BACKGROUND OF THE INVENTION

1. Field of the Invention

The present invention relates to a machining time prediction system, and more particularly, to a machining time prediction system in which a plurality of CNC machine tools operate in cooperation to predict a machining time.

2. Description of the Related Art

Operators who create or correct an NC program often want to check a machining time by the NC program when creating or correcting the NC program.

For this reason, a time actually required for machining is predicted by a machining time prediction function as one of simulations performed before the machining.

Performing high-speed and short-time machining time prediction requires hardware resources such as high-performance calculation performance of a CPU and a sufficient memory.

However, when hardware resources are lacking because a machining shape is complicated or an operator is executing another application and using the CPU or memory, machining time prediction may take time or may not be performed.

Japanese Patent Application Laid-Open No. 2004-227028 discloses a technique for a controller to divide a machining program for machining a workpiece into machining steps, calculate a cycle time (machining time) for each divided machining step and display the result on a display section.

Japanese Patent Application Laid-Open No. 2006-106858 discloses a technique relating to a distributed processing system that connects a master server that controls distributed processing of a calculation task for efficiently calculating a large volume of data and a plurality of slave servers connected to the master server via a network to execute arithmetic processing of the distributed calculation task, and processes the distributed calculation task.

The aforementioned technique disclosed in Japanese Patent Application Laid-Open No. 2004-227028 calculates a cycle time for each machining step of the machining program of a workpiece, the calculation is performed by only one controller and the cycle time is calculated so that an operator may determine whether order of machining performed for the workpiece is appropriate or not. Therefore, when hardware resources of the controller are lacking, the calculation of cycle time may take time.

The aforementioned technique disclosed in Japanese Patent Application Laid-Open No. 2006-106858 divides the calculation task so that the processing of the calculation task is distributed among a plurality of slave servers, but even though a cumulative calculation amount of each slave server is assumed to be uniform, a processing capability or the like of each slave server is not taken into consideration, and therefore calculation may not be carried out in an appropriate time depending on a situation of the slave server.

SUMMARY OF THE INVENTION

It is therefore an object of the present invention to provide a machining time prediction system capable of shortening a processing time when predicting a machining time in a CNC machine tool.

A machining time prediction system that predicts a machining time according to an aspect of the present invention includes a machining program dividing unit for dividing a machining program executed by a machine tool into a plurality of sections, a machining program transfer unit for transferring the divided machining programs to at least one arithmetic unit, a machining time receiving unit for receiving the machining time calculated by the arithmetic unit, and a machining time integrating unit for integrating the machining time received by the machining time receiving unit.

According to the machining time prediction system in this aspect, especially in the case where hardware resources of an arithmetic processing apparatus for calculating a machining time are lacking, it is possible to shorten the processing time by carrying out necessary calculations in cooperation with other management apparatuses or machine tools, prevent a load from being biased to some machine tools, reduce the load and achieve efficient use of resources on a network.

The machining program dividing unit may divide the machining program at a position of a command, among commands described in the machining program, where all axes of the machine tool are stopped.

In the embodiment, the machining program is divided at the position of the command where all axes of the machine tool are stopped, and therefore it is possible to reliably calculate the total machining time without being affected by operations before and after the dividing position of the machining program.

The machining program dividing unit may divide the machining program in a manner such that parts of divided sections before and after the dividing position partially overlap, and the machining time integrating unit may integrate machining times received by the machining time receiving unit, and then subtract the machining time of the overlapping parts.

In the embodiment, the machining program is divided by causing the machining program to overlap before and after the dividing position and the machining time of the overlapping part during integration is subtracted, and it is thereby possible to reliably calculate the total machining time without being affected by operations before and after the dividing position of the machining program.

A machine tool according to an aspect of the present invention is available for a machining time prediction system that predicts a machining time, the machine tool including a machining program dividing unit for dividing a machining program into a plurality of sections, a machining program transfer unit for transferring the divided machining programs to at least one arithmetic unit, a machining time receiving unit for receiving the machining time calculated by the arithmetic unit and a machining time integrating unit for integrating machining times received by the machining time receiving unit.

The machining program dividing unit may divide the machining program at a position of a command, among commands described in the machining program, where all axes of the machine tool are stopped.

The machining program dividing unit may divide the machining program in a manner such that parts of divided sections before and after the dividing position partially overlap, and the machining time integrating unit may integrate machining times received by the machining time receiving unit, and then subtract the machining time of the overlapping parts.

A management apparatus according to a further aspect of the present invention is available for a machining time prediction system that predicts a machining time, the management apparatus including a machining program dividing unit for dividing a machining program to be executed by a machine tool into a plurality of sections, a machining program transfer unit for transferring the divided machining programs to at least one arithmetic unit, a machining time receiving unit for receiving the machining time calculated by the arithmetic unit, and a machining time integrating unit for integrating the machining times received by the machining time receiving unit.

The machining program dividing unit may divide the machining program at a position of a command, among commands described in the machining program, where all axes of the machine tool are stopped.

The machining program dividing unit may divide the machining program in a manner such that parts of divided sections before and after the dividing position partially overlap, and the machining time integrating unit may integrate machining times received by the machining time receiving unit, and then subtract the machining time of the overlapping parts.

According to the present invention, it is possible to provide a machining time prediction system capable of shortening a processing time when predicting a machining time in a CNC machine tool.

BRIEF DESCRIPTION OF THE DRAWINGS

FIG. 8 is a diagram for describing calculation of a machining time in another machine tool or the like;

DETAILED DESCRIPTION OF THE PREFERRED EMBODIMENTS

First Embodiment

Figure 1:
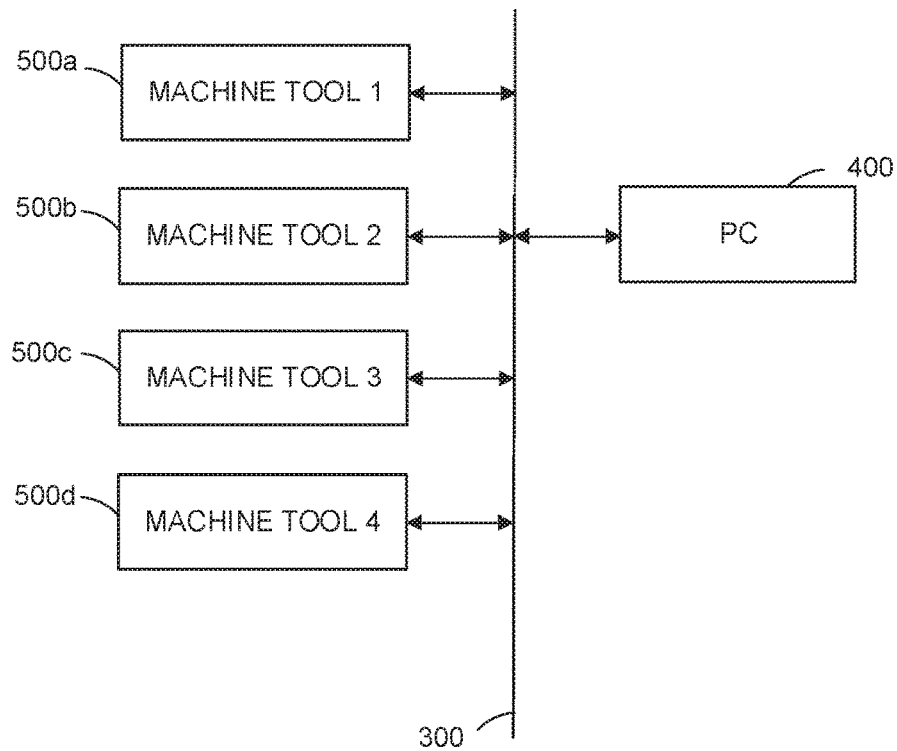
FIG. 1 is a schematic view illustrating an overall configuration of the present invention.

A machining time prediction system of the present invention comprises a PC or the like which is a management apparatus and a plurality of machine tools. FIG. 1 is a schematic view illustrating an overall configuration of a machining time prediction system of the present invention.

As shown in FIG. 1, in the machining time prediction system of the present invention, a PC 400 and each machine tool 500 such as machine tool 1 (500a) to machine tool 4 (500d) are connected to a network 300, and the PC 400 and each machine tool 500 can mutually transfer an NC program 32 and mechanical state information including parameters such as acceleration/deceleration speed specific to each machine tool 500 and modal information.

Figure 2:
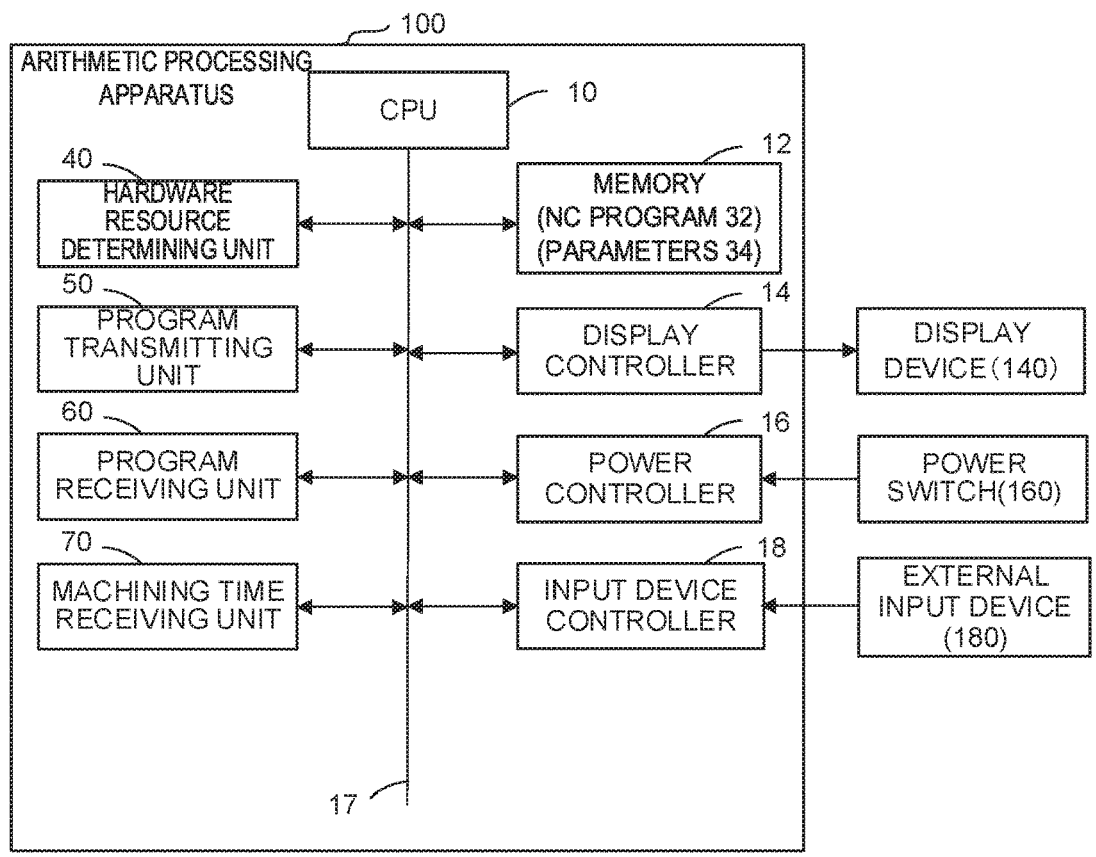
FIG. 2 is a block diagram of main parts according to an embodiment of the present invention.

FIG. 2 is a block diagram of main parts of the arithmetic processing apparatus 100 of the PC 400 and each machine tool 500 in the present embodiment.

The arithmetic processing apparatus 100 includes a CPU 10 which is a processor that performs arithmetic processing, a memory 12 made up of a RAM or ROM, a display controller 14 that controls a display device 140, a power controller 16 that controls ON/OFF of power of the arithmetic processing apparatus 100 according to an ON/OFF signal from the power switch 160, an input device controller 18 that controls an external input device 180, a hardware resource determining unit 40 for determining a state of hardware resources such as the CPU 10 and the memory 12, a program transmitting unit 50 for transmitting a program to the other machine tool 500 or the like, a program receiving unit 60 for receiving a program from the other machine tool 500 or the like, and a machining time receiving unit 70 for receiving a machining time calculated by the other machine tool 500, all of which are connected to one another via a bus 17.

The memory 12 is storage unit for storing a NC program 32 for machining of a machine tool, parameters 34 such as acceleration/deceleration parameters specific to each machine tool and modal information, and various types of data inputted from outside by the external input device 180 or the like. A keyboard is one example of the external input device 180 and input data from the external input device 180 is taken into the arithmetic processing apparatus 100 via the input device controller 18. Functions of other components such as the hardware resource determining unit 40, the program transmitting unit 50, the program receiving unit 60 and the machining time receiving unit 70 will be described later.

Figure 3:
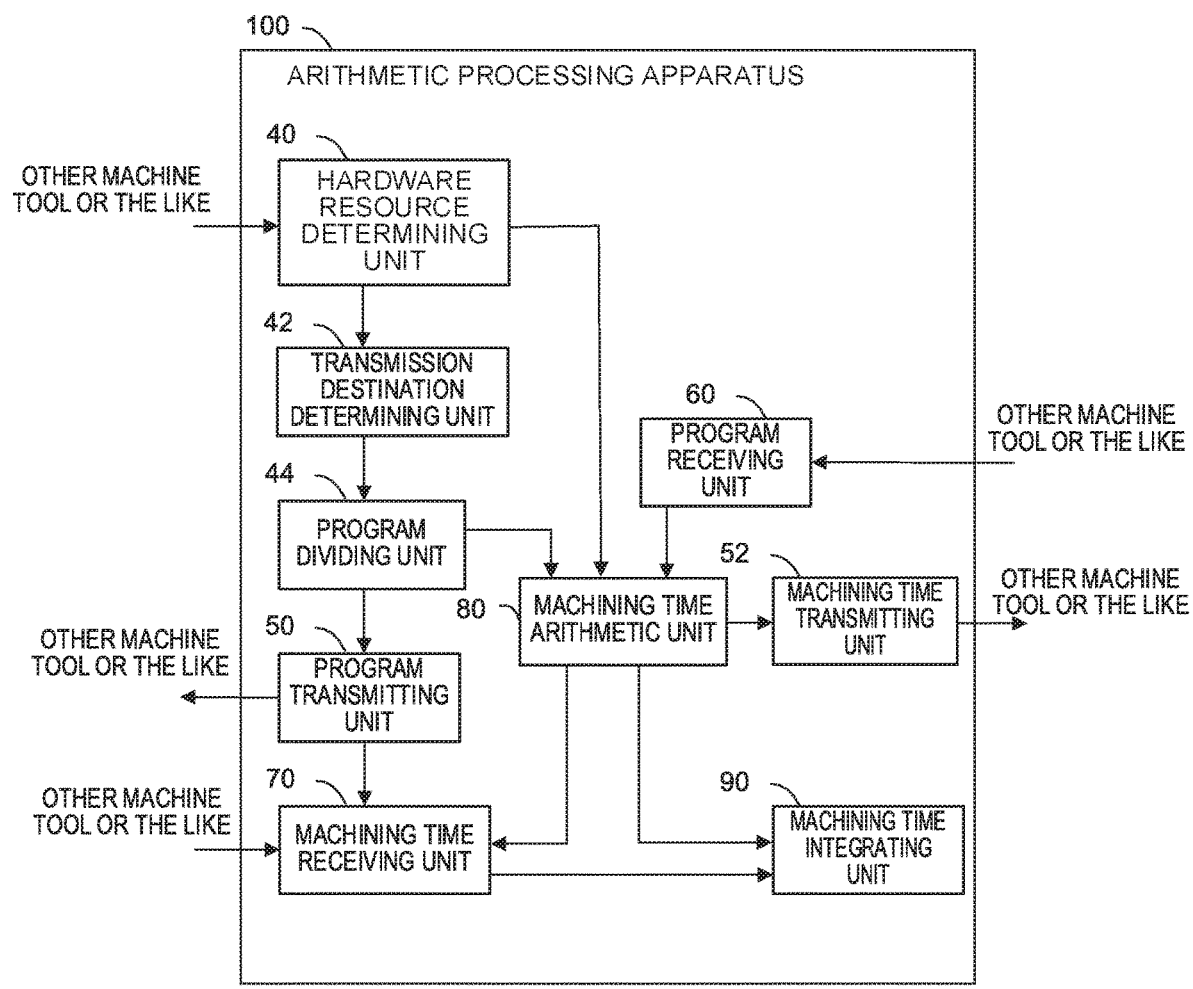
FIG. 3 is a functional block diagram of an arithmetic processing apparatus according to the embodiment of the present invention.

FIG. 3 is a functional block diagram of the arithmetic processing apparatus 100 according to the present embodiment.

The arithmetic processing apparatus 100 is provided with a hardware resource determining unit 40, a transmission destination determining unit 42, a program dividing unit 44, a program transmitting unit 50, a machining time receiving unit 70, a program receiving unit 60, a machining time arithmetic unit 80, a machining time transmitting unit 52, and a machining time integrating unit 90.

With reference to the NC program 32 and the various parameters 34 stored in the memory 12, the hardware resource determining unit 40 checks operation situations of the CPU 10 and the memory 12 in the arithmetic processing apparatus 100 in the PC 400 and each machine tool 500 in which the arithmetic processing apparatus 100 is incorporated and determines a margin for operation processing of the arithmetic processing apparatus 100. Furthermore, as will be described later, the hardware resource determining unit 40 also receives operation situations of the CPU 10 and the memory 12 in the machine tool 500 in which the arithmetic processing apparatus 100 is incorporated and a margin for operation processing by the hardware resource determining unit 40 in other machine tools.

In the present embodiment, the hardware resource determining unit 40 checks hardware resources such as the CPU 10 and the memory 12 in the arithmetic processing apparatus 100, and in the case where it is determined that there is little margin for operation processing in hardware resources because the operator is performing other work, for example, the hardware resource determining unit 40 transfers the divided programs and parameters necessary for calculation to the other machine tool 500 and PC 400, and the machine tool 500 and the PC 400 calculate machining times for the divided programs respectively.

Figure 4:
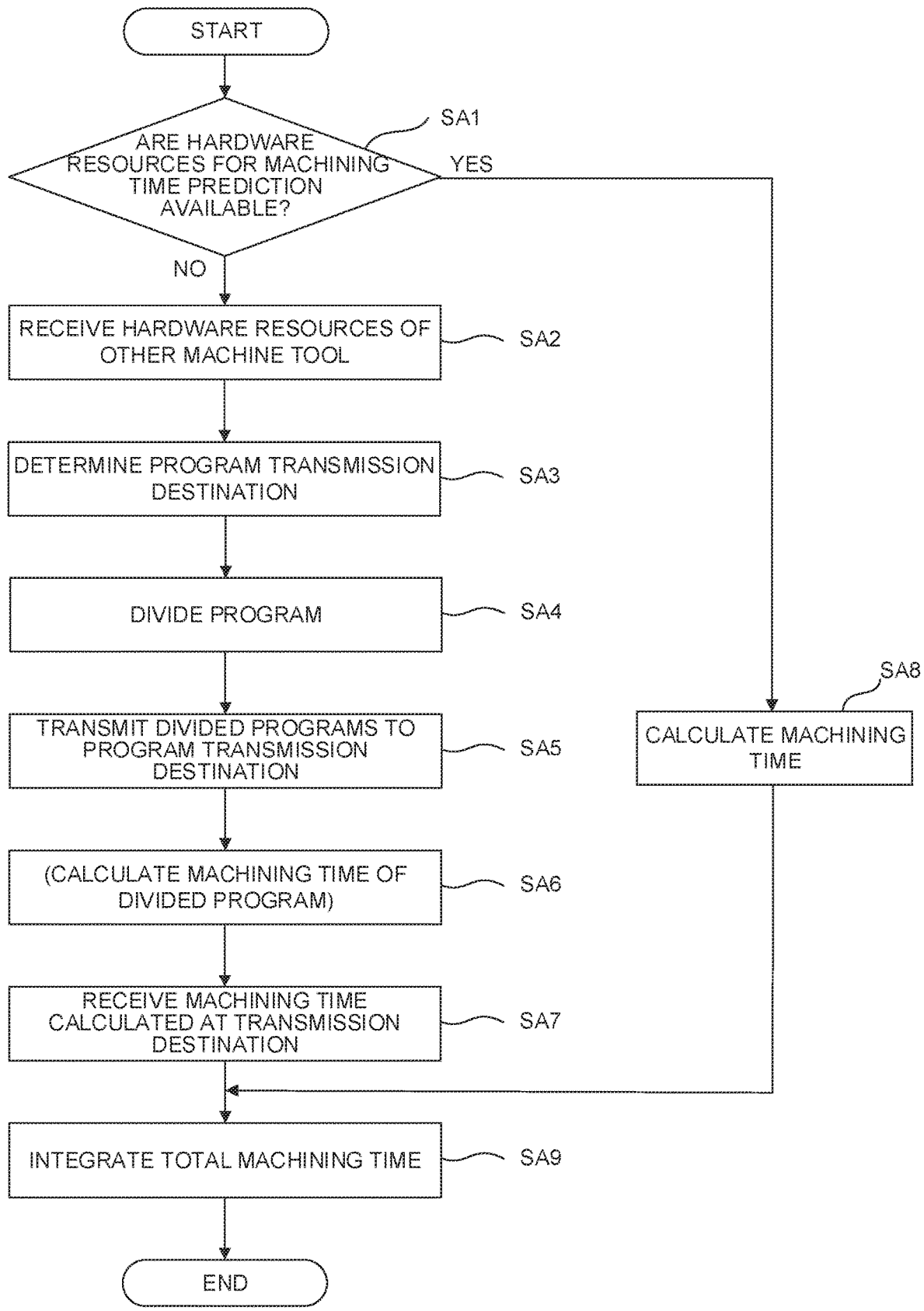
FIG. 4 is a flowchart describing a processing flow according to the embodiment of the present invention.

Hereinafter, these processes will be described in detail. FIG. 4 is a flowchart describing a processing flow according to the present embodiment and FIG. 5 is a diagram resulting from extracting functions to be used when dividing the NC program 32 from the functional block diagram of the arithmetic processing apparatus 100 shown in FIG. 3, and FIG. 6 is a diagram resulting from extracting functions to be used when not dividing the NC program 32 from the functional block diagram of the arithmetic processing apparatus 100 shown in FIG. 3.

Next, operation of the present embodiment will be described step by step based on the flowchart in FIG. 4.

(Step SA1) The hardware resource determining unit 40 determines whether or not there are hardware resources enough to calculate machining time prediction of the entire NC program 32 in the arithmetic processing apparatus 100 of the machine tool 500. The flow proceeds to step SA8 when there are enough hardware resources (YES) or proceeds to step SA2 when there are not enough hardware resources (NO).

Figure 5:
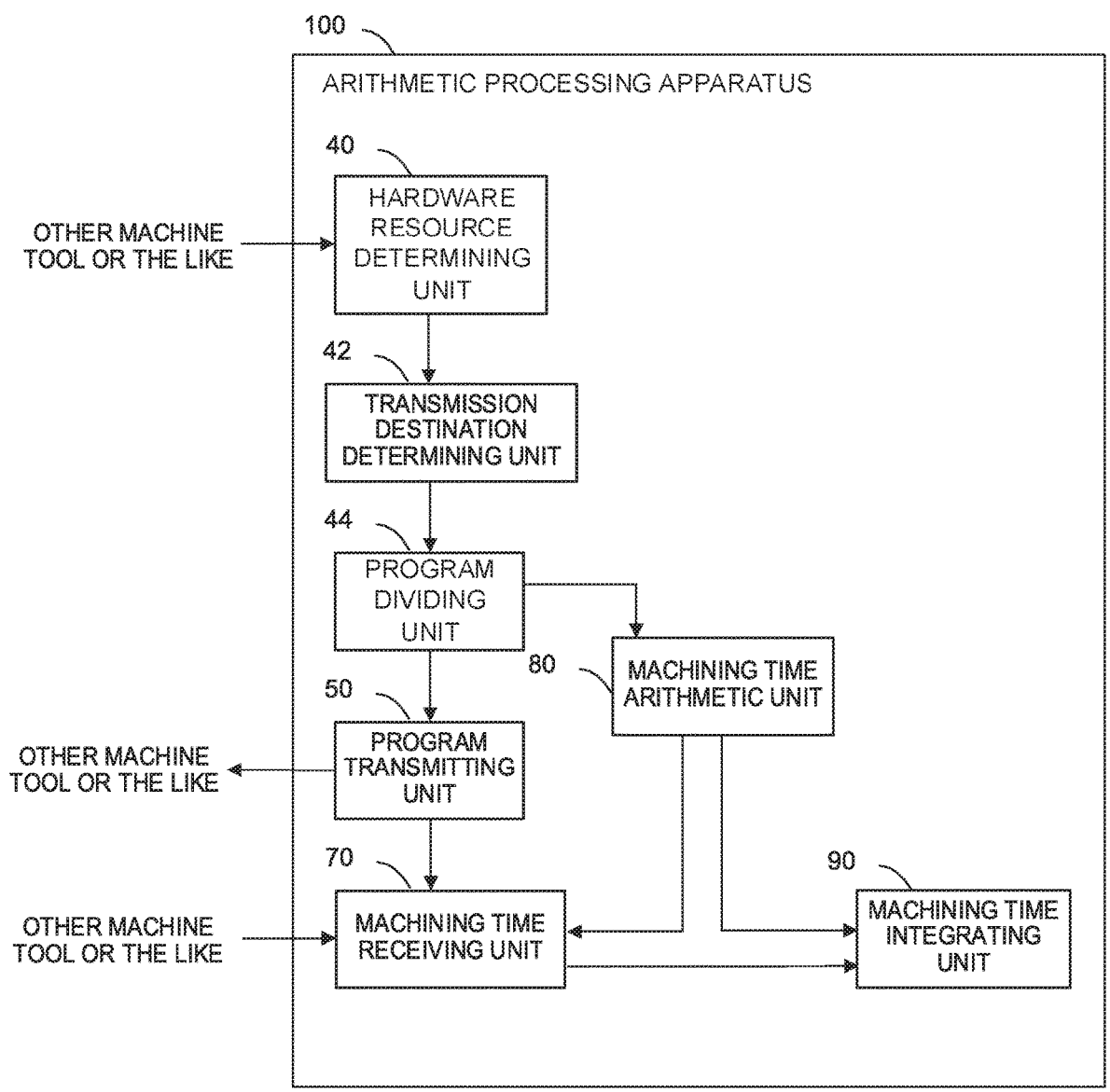
FIG. 5 is a diagram resulting from extracting functions to be used when dividing an NC program from the functional block diagram of the arithmetic processing apparatus shown in FIG. 3.
Figure 6:
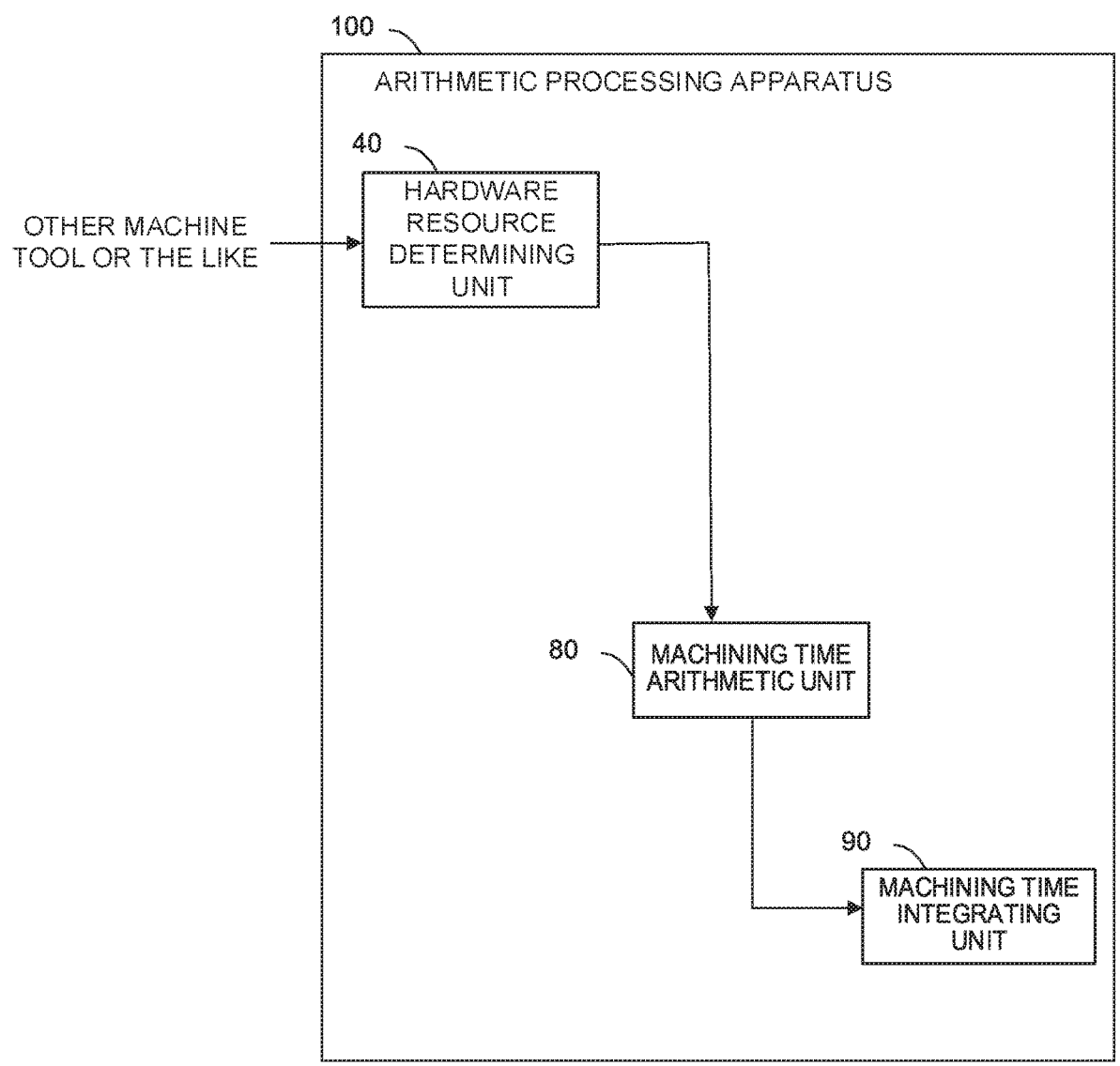
FIG. 6 is a diagram resulting from extracting functions to be used when not dividing an NC program from the functional block diagram of the arithmetic processing apparatus shown in FIG. 3.

Operation from step SA2 so SA7 below (function carried out when hardware resources are not enough) is shown in FIG. 5.

(Step SA2) Similarly to step SA1, the determination result of hardware resources in the other machine tool 500 determined by the hardware resource determining unit in the other machine tool 500 or the like is received.

(Step SA3) The transmission destination determining unit 42 determines a transmission destination as arithmetic unit for calculating the divided program. In determining the transmission destination, the transmission destination determining unit 42 determines the transmission destination of the program with reference to the number of other machine tools 500 received in step SA2 and the determination results of the hardware resource determining unit of the other machine tool 500. As the method of determining the transmission destination, when the situation of use of hardware resources in the other machine tool 500 exceeds a predetermined threshold, the transmission destination determining unit 42 determines that there is not enough time to carry out calculation of a machining time prediction, and transmits the NC program 32 by equally dividing the NC program 32 by the number of machine tools not exceeding a threshold. Furthermore, it is also possible to change a ratio of the amount of the program to be divided according to the processing capability of the CPU 10 or the like for each machine tool 500 and transmit the program.

(Step SA4) The program dividing unit 44 divides the program. More specifically, the program dividing unit 44 may divide the program by a number corresponding to the number of machine tools at which the situation of use of hardware resources in the other machine tool 500 does not exceed a threshold or may divide the program at a point at which the program is divisible irrespective of the number of machine tools at the transmission destination. In the latter case, after the program is divided, a process of combining the divided programs in accordance with the transmission destination machine tool is necessary. All the divided programs may be transmitted to the other machine tools or some of the divided programs may not be transmitted but may be calculated in the arithmetic processing apparatus 100. Details of the program division process will be described later.

(Step SA5) The NC program 32 divided by the program dividing unit 44 and the parameters 34 necessary to calculate a machining time of the NC program 32 are transmitted to the program transmission destination determined by the transmission destination determining unit 42. A calculation of the machining time of the NC program 32 in the other machine tool 500 after the transmission will be described later.

(Step SA6) In case where some of the NC programs 32 are calculated in the arithmetic processing apparatus 100 without transmitting them, the program dividing unit 44 calculates machining times of the NC programs 32 which have not been transmitted by the machining time arithmetic unit 80.

(Step SA7) The machining time receiving unit 70 receives the machining time of the NC program 32 calculated in the other machine tool 500.

(Step SA8) Since the machining time can be calculated without dividing the NC program 32, the machining time arithmetic unit 80 calculates the machining time of the total NC program 32.

(Step SA9) The machining time integrating unit 90 integrates the machining time calculated in the arithmetic processing apparatus 100 and the machining time calculated in the other machine tools 500.

When calculating the machining time of the NC program, a general calculation method which is conventionally practiced can be used. In general machining, the total machining time can be calculated by calculating the machining time from a relationship between a machining length and a machining speed and further adding up the rise time and fail time using time constant parameters. Furthermore, as another technique, it is also possible to divide a tool path into segments which are fine pieces, calculate a machining time for each segment using a segment length and a moving speed of the tool in the segment and integrate the machining times. When the divided NC program is an auxiliary function, it is possible to store the time required for the auxiliary function in the form of a table or the like in advance and read such data and thereby calculate the time.

Figure 7:
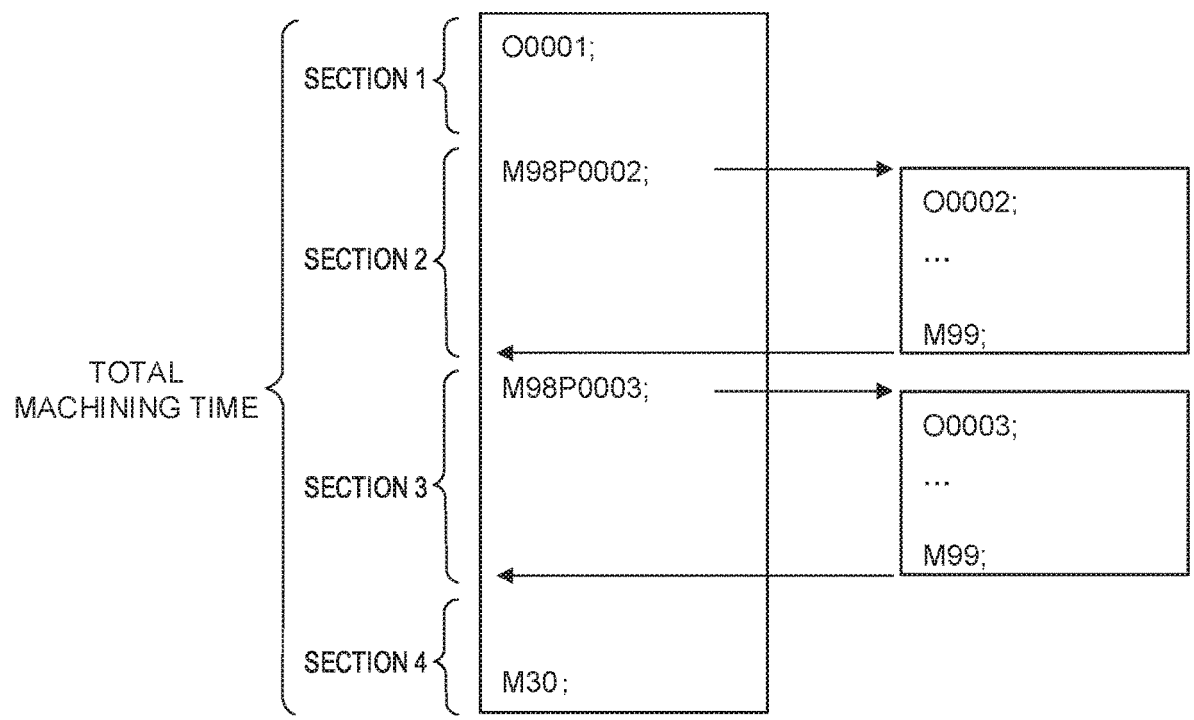
FIG. 7 is a diagram for describing a technique of dividing the NC program.

FIG. 7 is a diagram for describing a technique of dividing the NC program 32.

The program dividing unit 44 processes the NC program 32 read from the memory 12 for each block, performs processes of discriminating a "section division condition" and dividing the NC program 32 into sections corresponding to a plurality of blocks.

Here, when discriminating the "section division condition", for dividing the NC program into sections, the NC program is first divided into blocks including an auxiliary code or blocks having an instruction called "subprogram call" at the head, and then the NC program is further divided at a part of a code such as T code or M code or a part of a command such as dwell command where all axes are stopped, as "section division conditions".

The program dividing unit 44 may be configured to divide the NC program 32 at all locations where the section division conditions are satisfied or change the number of locations to be divided and the amount of program of divided blocks in consideration of the number of destination apparatuses determined by the transmission destination determining unit 42.

Figure 8:
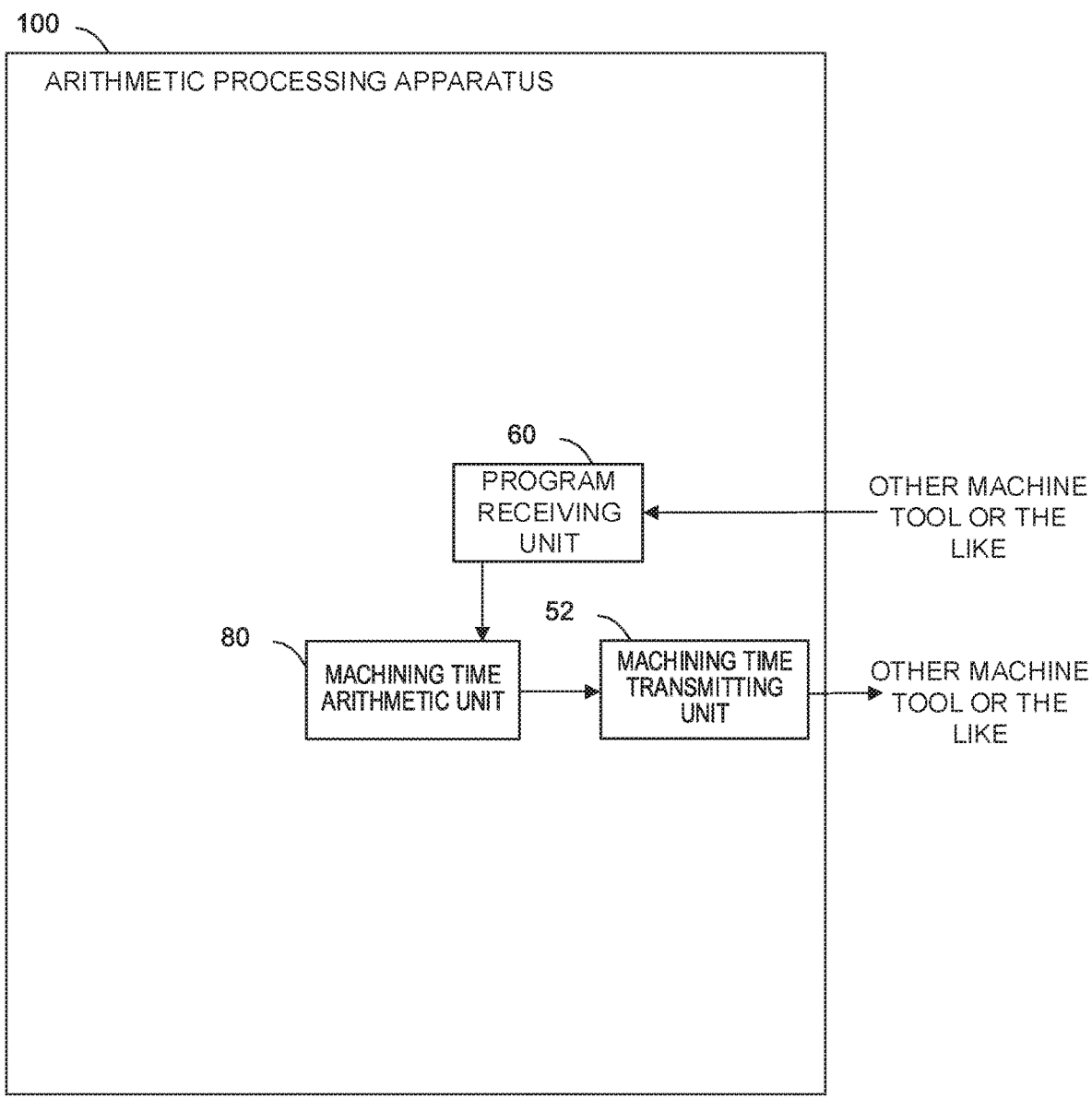

FIG. 8 is a diagram for describing a calculation of a machining time at the transmission destination of the program such as the other machine tool 500 determined by the transmission destination determining unit 42 in step SA6 in the flowchart in FIG. 4. The basic configuration to calculate the machining time is similar to the functional block diagram of the arithmetic processing apparatus 100 shown in FIG. 3 where the functions used to calculate the machining time of the divided NC program 32 are extracted.

The program receiving unit 60 receives the divided NC program 32 transmitted from the other machine tool 500 or the like. The received NC program 32 is sent to the machining time arithmetic unit 80, the machining time arithmetic unit 80 calculates the machining time in the NC program 32 transmitted, transmits the calculated machining time to the machining time transmitting unit 52 and the machining time transmitting unit 52 transmits the machining time to the other machine tool 500 which is the transmission source.

Each machine tool 500 calculates the machining time of the divided NC program 32, and the machining time receiving unit 70 which is the transmission source receives the calculated machining time and also receives the machining times calculated by the other machine tools 500. And the machining time integrating unit 90 integrates the machining time calculated in the arithmetic processing apparatus 100 and the machining times calculated in the other machine tools 500 and thereby calculates a total machining time.

Figures 9, 10:
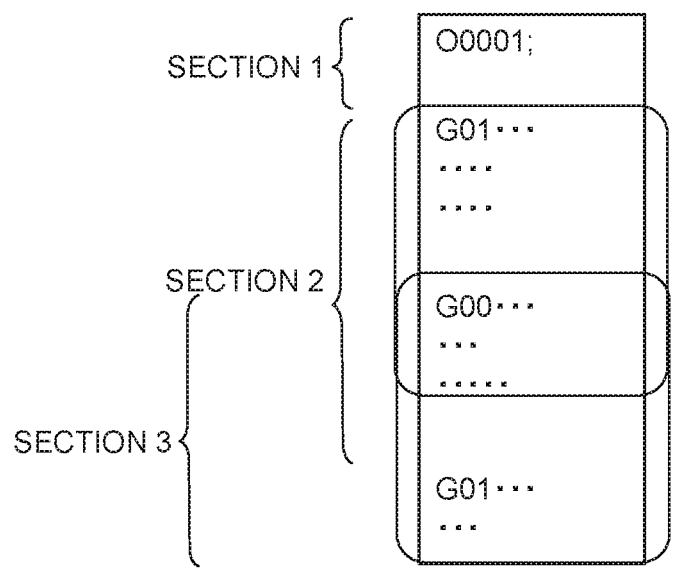
FIG. 9 is a diagram illustrating an example of a machining time calculation result.
FIG. 10 is a diagram for describing a technique of dividing an NC program.

FIG. 9 is a diagram illustrating an example of a machining time calculation result where the NC program 32 is divided into four sections, each machine tool 500 calculates a machining time, these calculated machining times are integrated, and a total machining time of seven minutes is calculated.

Note that when the NC program 32 is divided to calculate the machining time, compared to the case where the machining time of the whole NC program 32 is calculated, there may be a difference in time required for processing between locations before and after division, but the description of the present embodiment is given assuming that there is no influence of the difference.

Second Embodiment

Next, the present embodiment will be described based on FIG. 10. In the present embodiment, although the basic configuration is similar to that of the foregoing embodiment, the present embodiment is different in the method of dividing the NC program 32. In the foregoing embodiment, the program is divided at parts where all axes are stopped such as tool replacement parts, dwell command position or the like of the NC program 32, whereas in the present embodiment, the program is divided in a manner such that parts of divided sections before and after the dividing position partially overlap as shown in FIG. 10.

As seen in a relation between a section 2 and a section 3 in FIG. 10, the program is divided by causing parts where an interpolation method is changed such as G00 and G01 to overlap. As in the case of the foregoing embodiment, the divided NC program 32 is transmitted to the other machine tool 500 or the like and calculated. After dividing the program and calculating the machining time, the machining time receiving unit 70 which is the transmission source receives the calculated machining time and also receives the machining times calculated by the other machine tools 500.

And the machining time integrating unit 90 integrates the machining time calculated in the arithmetic processing apparatus 100 and the machining times calculated by the other machine tools 500, deletes the overlapping part of these machining times and then calculates a total machining time. The machining time corresponding to the overlapping part can be calculated from the machining distance and the machining speed at the overlapping part.

Note that a case has been described in the embodiments as an example where when hardware resources are lacking, the arithmetic processing apparatus 100 of the machine tool 500 divides the NC program 32 of one machine tool 500 and transmits the divided NC program 32 to the other machine tool 500 where the situation of use of hardware resources does not exceed a threshold, but the present invention is not limited to this example. In the embodiments, an example has been described where the divided NC program 32 is transmitted to a plurality of other machine tools 500. However, as the transmission destination as the arithmetic unit, the NC program 32 may be transmitted to a management apparatus such as one of the other machine tools 500 or PC 400 having a processing capability all in one piece without dividing the program and the machining time is calculated or the number of divisions may be set to 2 and the machining time may be calculated by two machine tools: the machine tool 500 and one of the other machine tools 500.

Although the hardware resource determining unit 40 in the arithmetic processing apparatus of the other machine tools 500 itself determines whether or not the situation of use of hardware resources of the other machine tool 500 exceeds a threshold, the machine tool 500 on the NC program 32 transmitting side may determine hardware resources of the other machine tool 500 or the management apparatus such as the PC 400 connected on the network 300 may determine the hardware resources.

Furthermore, in the machine tool 500 for which it is desirable to predict a machining time of the NC program 32, the management apparatus such as the PC 400 may determine whether or not hardware resources are lacking, divide the NC program 32 after that, transfer the divided program to the other machine tool 500 or perform integrating processing of the machining time after calculating the machining time instead of the machine tool 500.

The invention claimed is:

1. A machining time prediction system that predicts a machining time, comprising:
   a machining program dividing unit for dividing a machining program executed by a machine tool into a plurality of sections;
   a machining program transfer unit for transferring the divided machining programs to at least one arithmetic unit;
   a machining time receiving unit for receiving the machining time calculated by the arithmetic unit; and
   a machining time integrating unit for integrating the machining time received by the machining time receiving unit,
   wherein the machining program dividing unit divides the machining program in a manner such that parts of divided sections before and after the dividing position partially overlap, and
   the machining time integrating unit integrates machining times received by the machining time receiving unit, and then subtracts the machining time of the overlapping parts.

2. The machining time prediction system according to claim 1, wherein the machining program dividing unit divides the machining program at a position of a command, among commands described in the machining program, where all axes of the machine tool are stopped.

3. A machine tool available for a machining time prediction system that predicts a machining time, comprising:
- a machining program dividing unit for dividing a machining program into a plurality of portions;
- a machining program transfer unit for transferring the divided machining programs to at least one arithmetic unit;
- a machining time receiving unit for receiving the machining time calculated by the arithmetic unit; and
- a machining time integrating unit for integrating machining times received by the machining time receiving unit,
- wherein the machining program dividing unit divides the machining program in a manner such that parts of divided sections before and after the dividing position partially overlap, and
- the machining time integrating unit integrates machining times received by the machining time receiving unit, and then subtracts the machining time of the overlapping parts.

4. The machine tool according to claim 3, wherein the machining program dividing unit divides the machining program at a position of a command, among commands described in the machining program, where all axes of the machine tool are stopped.

5. The machine tool according to claim 3, wherein the machining program dividing unit divides a tool path into segments and the arithmetic unit calculates the machining time for each segment using a segment length and a moving speed of the machining tool.

6. A management apparatus available for a machining time prediction system that predicts a machining time, the management apparatus comprising:
- a machining program dividing unit for dividing a machining program to be executed by a machine tool into a plurality of portions;
- a machining program transfer unit for transferring the divided machining programs to at least one arithmetic unit;
- a machining time receiving unit for receiving the machining time calculated by the arithmetic unit; and
- a machining time integrating unit for integrating the machining times received by the machining time receiving unit,
- wherein the machining program dividing unit divides the machining program in a manner such that parts of divided sections before and after the dividing position partially overlap, and
- the machining time integrating unit integrates machining times received by the machining time receiving unit, and then subtracts the machining time of the overlapping parts.

7. The management apparatus according to claim 6, wherein the machining program dividing unit divides the machining program at a position of a command, among commands described in the machining program, where all axes of the machine tool are stopped.

8. The management apparatus according to claim 6, wherein the machining program dividing unit divides a tool path into segments and the arithmetic unit calculates the machining time for each segment using a segment length and a moving speed of the machining tool.

* * * * *